United States Patent
Yang

[19]

[11] Patent Number: 5,956,101
[45] Date of Patent: Sep. 21, 1999

[54] CRT SUPPORT FRAME AND MONITOR COMPRISING THE SAME

[75] Inventor: Dong Wook Yang, Kyungki-do, Rep. of Korea

[73] Assignee: SamSung Electronics Co., Ltd., Kyungki-do, Rep. of Korea

[21] Appl. No.: 09/057,591

[22] Filed: Apr. 9, 1998

[30] Foreign Application Priority Data

Apr. 9, 1997 [KR] Rep. of Korea ............. 97-7282 U
Jun. 25, 1997 [KR] Rep. of Korea ........... 97-15706 U

[51] Int. Cl.[6] ............................................. H04N 5/64
[52] U.S. Cl. ...................... 348/843; 312/7.2; 348/826
[58] Field of Search ........................ 312/7.2; 348/843, 348/824, 825, 826, 836, 834, 844; 220/2.1 A, 2.3 R, 2.3 A

[56] References Cited

U.S. PATENT DOCUMENTS

| | | | |
|---|---|---|---|
| 4,017,129 | 4/1977 | Boldt et al. ........................... | 312/7.2 |
| 4,063,289 | 12/1977 | Veenendaal ........................ | 348/836 |
| 4,570,892 | 2/1986 | Crech et al. . | |
| 4,651,218 | 3/1987 | Fazioli ................................ | 348/826 |
| 4,678,447 | 7/1987 | Prezak, III . | |
| 5,084,757 | 1/1992 | Leo et al. ............................ | 348/825 |
| 5,288,049 | 2/1994 | Hays . | |
| 5,355,049 | 10/1994 | Sung . | |
| 5,363,150 | 11/1994 | Kojima .............................. | 348/843 X |
| 5,549,267 | 8/1996 | Armbruster et al. . | |
| 5,575,545 | 11/1996 | Wang . | |
| 5,588,625 | 12/1996 | Baek . | |
| 5,661,630 | 8/1997 | Levins . | |
| 5,730,512 | 3/1998 | Heirich .............................. | 312/7.2 |
| 5,742,360 | 4/1998 | Kwon et al. ....................... | 312/7.2 X |
| 5,806,940 | 9/1998 | Heirich .............................. | 312/7.2 |

*Primary Examiner*—Peter M. Cuomo
*Assistant Examiner*—Stephen Vu
*Attorney, Agent, or Firm*—Robert E. Bushnell, Esq.

[57] ABSTRACT

A support frame has second lugs at a location corresponding to the first lugs provided at corners of a CRT secured by the support frame. The support frame supports the weight of the CRT, and is disposed between the CRT and the rear case of a monitor. Each first lug and each second lug engage a front case by a means of bolt, securing the CRT and the support frame. A guide groove provided at the support frame and a guide portion push the front case outward, maintaining the outer form of the front case during and after assembly, and act as a guide when assembling the support frame and the front cover.

18 Claims, 6 Drawing Sheets

CRT SUPPORT FRAME AND MONITOR COMPRISING THE SAME

CLAIM OF PRIORITY

This application makes reference to, incorporates the same herein, and claims all benefits accruing under 35 U.S.C. §119 from applications entitled CRT SUPPORT FRAME AND MONITOR COMPRISING THE SAME earlier filed in the Korean Industrial Property Office on Apr. 9, 1997 and Jun. 25, 1997, and there duly assigned Serial No. 97-7282 and 97-15706 by that Office.

BACKGROUND OF THE INVENTION

1. Technical Field

The present invention relates to a support frame for securing a cathode ray tube ("CRT") of a monitor, and more specifically to a support frame for securing a CRT to a front case of the monitor.

2. Related Art

A monitor is a device for receiving signals from another device and displaying an image. Generally, the monitor comprises a substrate for processing externally applied signals and a CRT for visibly displaying on a phosphor screen the output data according to the applied signals. The CRT is installed on a support frame and is contained in a rectangular case.

As stated in more detail below, the construction of prior monitors has been such that, during assembly of the monitor, the CRT is fixed to the front case, and then a support frame is secured to the front case. Thus, separate assembly of the CRT and support frame takes place, and this results in an undesirable increase in assembly time. In addition, since the support frame is not effective when securing the CRT to the front case, the front case can be deformed after assembly due to the weight of the CRT. This causes an inferior result in that the outer shape of the monitor becomes distorted, and this allows external contaminants, such as dust, to intrude into the interior of the monitor. Therefore, there has been in need for the development of a monitor which does not have excessive assembly time, does not result in deformation of the front case of the monitor, and does not permit external contaminants to intrude into the interior of the monitor after assembly.

The following patents are considered to be representative of the prior art, but are burdened by the disadvantages set forth herein: U.S. Pat. No. 5,661,630 to Levins et al., entitled Precision-Aligned Monitor-Frame Unit In Combination With Chassis And Housing And Method Of Assembling Frame, U.S. Pat. No. 5,588,625 to Beak, entitled Monitor Stand Assembly, U.S. Pat. No. 5,575,545 to Wang, entitled Monitor Shell, U.S. Pat. No. 5,549,267 to Armbruster et al., entitled Frame Assembly And Composite Inclusive Thereof, U.S. Pat. No. 5,355,049 to Sung, entitled Assembly Of Shadow Mask Frame With Inner Shield For Color Cathode Ray Tube, U.S. Pat. No. 5,288,049 to Hays, entitled Secured Monitor Mounting Bracket, U.S. Pat. No. 4,678,447 to Prazak III, entitled Process Of Manufacturing For A High-Resolution Color Cathode Ray Tube, and U.S. Pat. No. 4,570,892 to Czech et al., entitled Tiltable Rotating Display Monitor Mount.

SUMMARY OF THE INVENTION

Therefore, an object of the present invention is to provide a support frame which can secure the front case, the CRT and the support frame at once, and a monitor comprising the same.

Another object of the present invention is to provide a support frame without separated spaces and to improve the external shape of the monitor by engaging inner guide ribs of the front case with guide grooves at the outer periphery of the support frame.

In order to achieve these objects, first lugs are provided at each corner portion of the monitor, and second lugs are provided at a location corresponding to the first lugs, said first lugs and second lugs being engaged to secure the CRT and the support frame in a support frame for securing the CRT of a monitor according to the present invention.

Also, a monitor for displaying an image according to external signals according to the present invention comprises: a front case; a CRT with first lugs at each corners thereof said CRT being disposed at a rear side of the front case; a rectangular support frame supporting and securing the front case; a circuit for applying signals to the CRT; a rear case secured at a back side of the front case to contain the CRT and the circuit; securing means which can engage the CRT, the front case and the support frame at once; and support means aligning the location of the front case and the support frame when assembling and supporting the front case to prevent distortion of the front case after the assembling.

At each outer corner of the CRT, the lugs can each be provided with holes. In this case, the lugs with holes can also be provided at the corresponding location of the support frame so that the CRT and the support frame can be secured to the front frame by engaging means, such as a bolt.

Preferably, a plurality of guide ribs are provided along an inner wall of the front case disposed at a front side of the CRT, and a plurality of guide grooves to receive the guide ribs are provided at an outer periphery of the support frame, whereby the support frame is guided when assembling the front case and the support frame. A guide portion, one end of which is partly bent to smoothly move said guide rib, can be provided at an inner surface of the guide groove.

The support frame can be manufactured by a press process, while the front case and the rear case can be manufactured by an injection molding process. Preferably, the guide ribs should have sufficient strength and a plurality of guide ribs should be provided when one guide rib is insufficient for support. The guide ribs can act as a guidance when assembling the front case and the support frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

The objects and advantages of the present invention will be more clearly understood to those skilled in the art with reference to the accompanying drawings in which.

DESCRIPTION OF THE PREFERRED EMBODIMENT

The present invention will now be described in detail referring to the accompanying drawings. The embodiment hereinafter described is illustrative and in no sense limiting.

Figure 1:
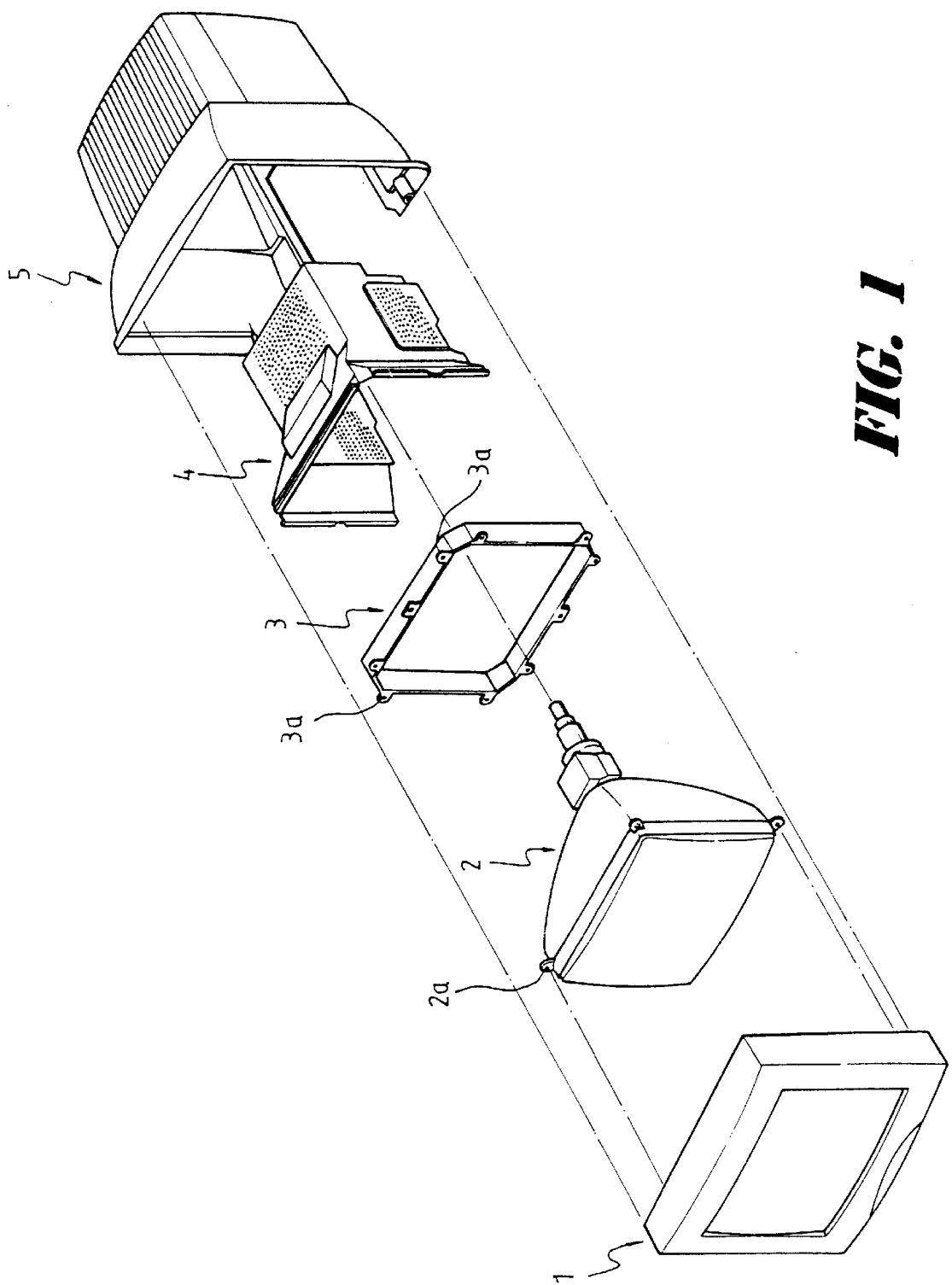
FIG. 1 is a schematic exploded perspective view of a monitor generally used.

As can be seen in FIG. 1, a monitor of a general form comprises a front case 1, a CRT 2 disposed at the rear side of the front case 1 and displaying an image according to a received signal, a support frame 3 for maintaining the outer form of the monitor and supporting the heavy CRT 2, and a rear case 5 for covering the rear side of the CRT. As can be seen in the drawing, a metal shield 4 can be placed between the rear case 5 and the CRT 2.

Figure 2:
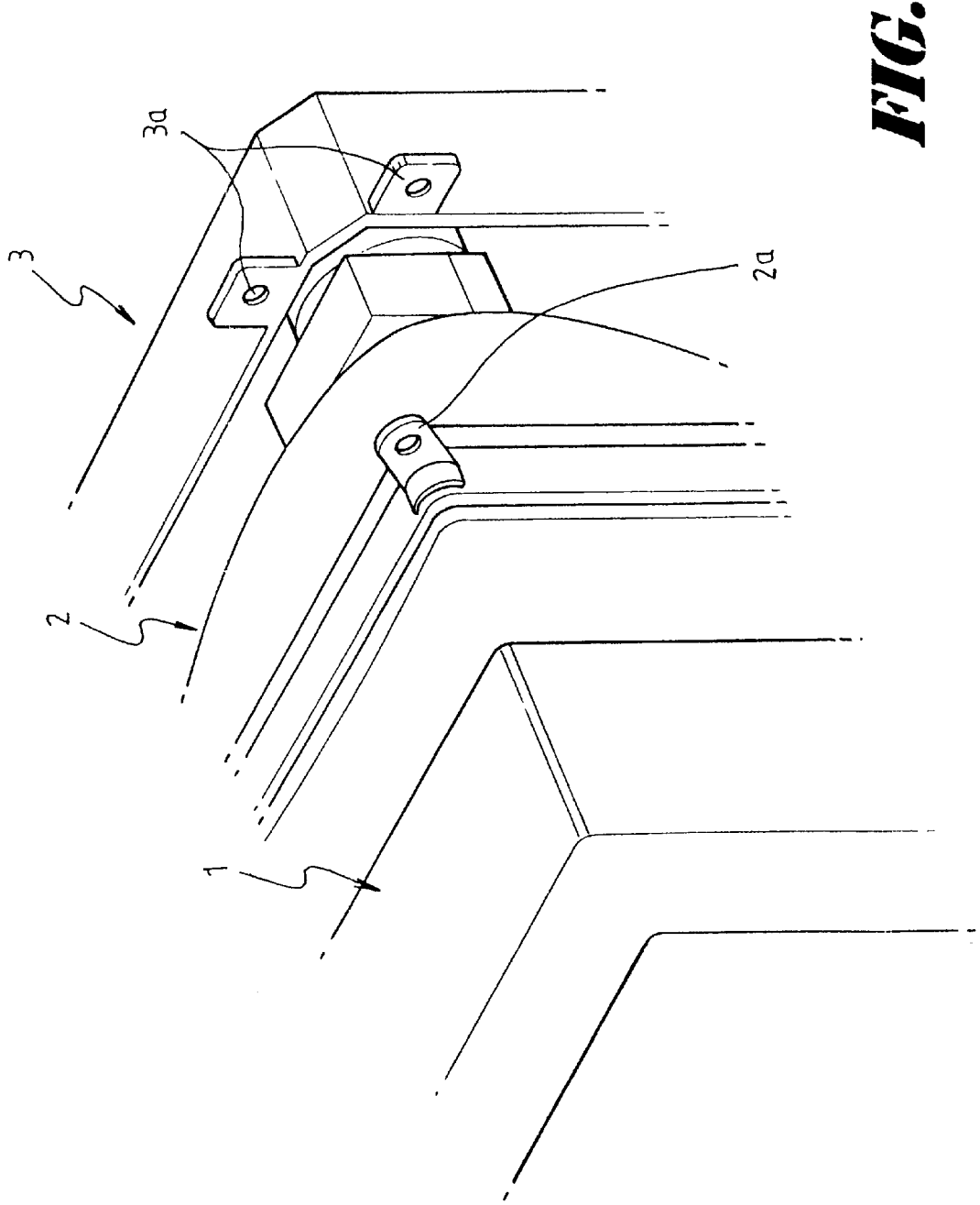
FIG. 2 illustrates in detail the relation between the parts of FIG. 1.

As can be seen in FIG. 2, since the location of lugs 2a of the CRT and the location of lugs 3a of a support frame 3 differ, the CRT 2 is fixed to the front case 1, and then the support frame 3 is secured to the front case 1 in monitors of this type. In monitors of this type, however, separate assembly of the CRT 2 and the support frame 3 increases the assembly time. Also, since the support frame 3 cannot be effective when securing the CRT 2 to the front case 1, the front case 1 is deformed after assembly due to the weight of the CRT 2, causing an inferior outer shape and allowing the intrusion of external contaminants, such as dust.

Figure 3:
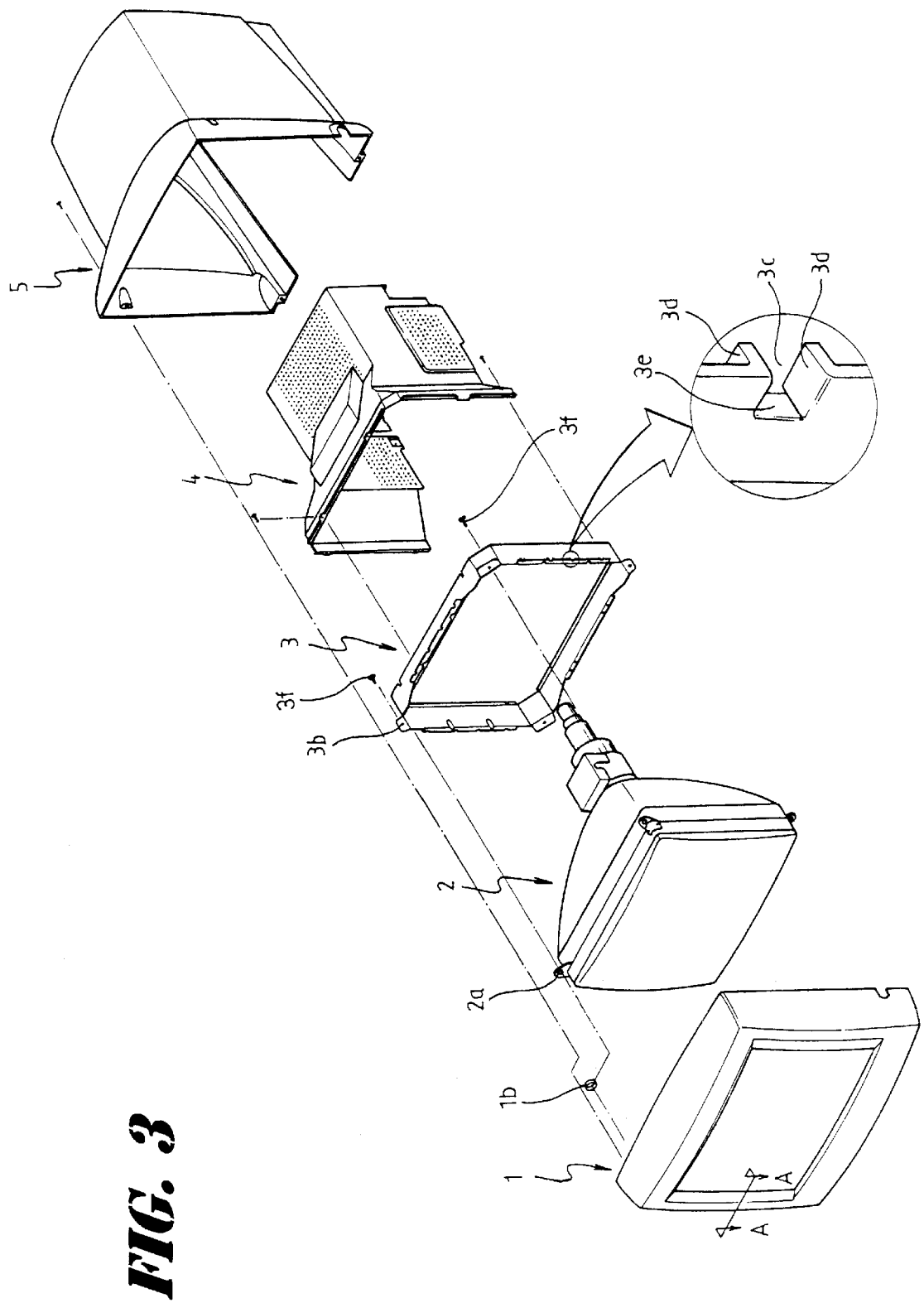
FIG. 3 is an exploded view of a monitor with a support frame according to an embodiment of the present invention.

As illustrated in FIG. 3, the monitor of the present invention is similar in some respects to the monitor of FIG. 1 and, therefore, identical reference numerals have been used when appropriate. The monitor of FIG. 3 comprises a front case 1, a CRT 2, a support frame 3, a shield 4 and a rear case 5. As can be seen from the drawing, the front case 1, the CRT 2 and the support frame 3 are engaged by bolts 3f, and shield 4 and rear case 5 are assembled from a back side of the monitor.

The front periphery of the support frame 3 is bent 90 degrees outward. A part of the bent portion is again bent, forming a guide portion 3d and a guide groove 3c. A plurality of these guide portions 3d and the guide grooves 3c are provided at various locations to guide the support frame 3 when assembling the front case 1 and the support frame 3.

Figure 4:
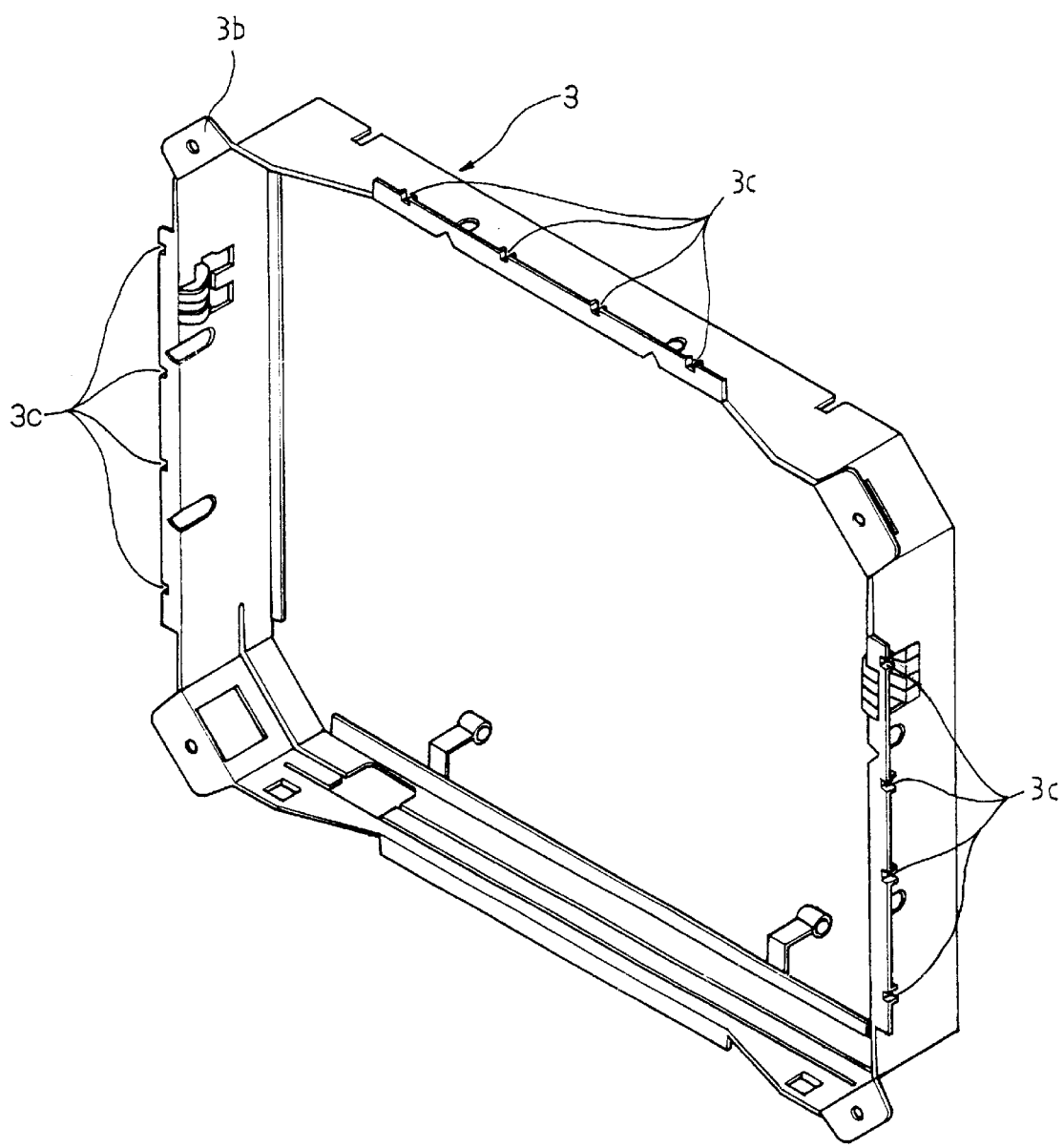
FIG. 4 illustrates in detail the support frame according to the present invention.

In FIG. 4, the support frame 3 is illustrated in detail. In this embodiment, the support frame is in the form of a steel frame, and lugs 3b are provided at each corner. The periphery of the support frame 3 has four sections, each being bent by 90 degrees, and each having four guide grooves 3c. The support frame 3 is manufactured by a press process. At the center of the lug 3b, a hole is provided through which an engaging bolt passes.

Figure 5:
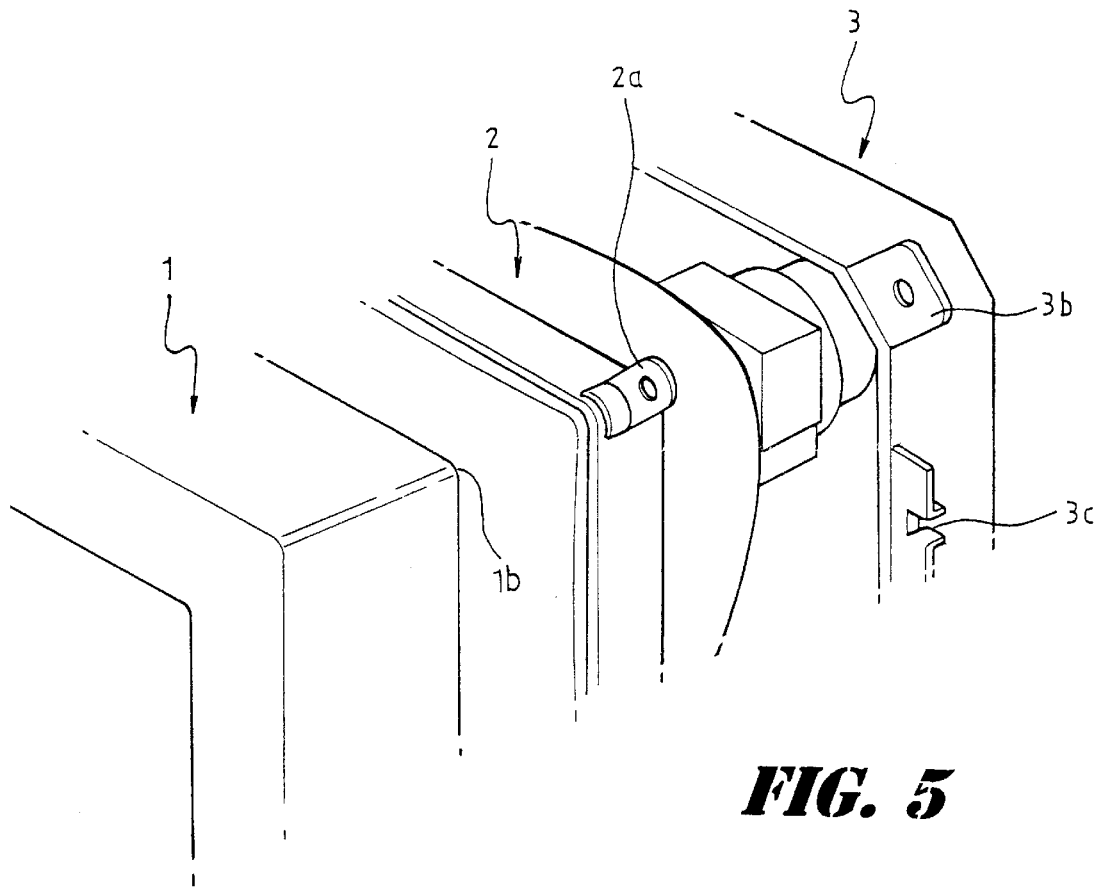
FIG. 5 illustrates in detail the relation between the parts of FIG. 3.

In FIG. 5, the relation between the support frame 3, the CRT 2 and the front case 1 is illustrated. A hole is formed at the center of the lug 2a of the CRT 2, and a hole of the lug 3b of the support frame 3 is formed at a corresponding location, as shown in the drawing. Therefore, bolts 3f are in turn inserted into these holes and the boss 1b, thereby securing the front case 1, the CRT 2, and the support frame 3.

Figure 6:
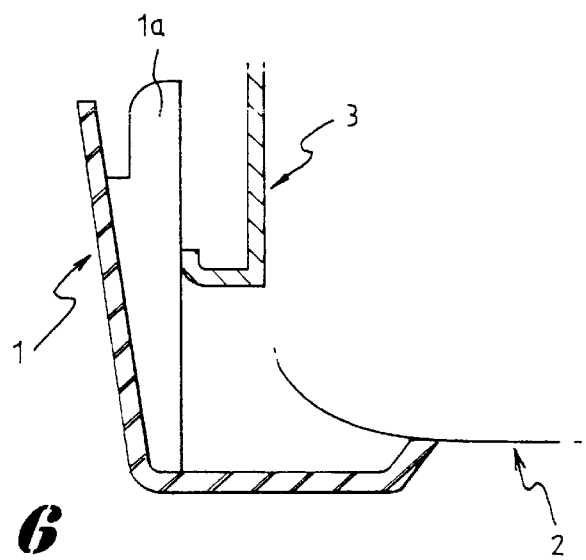
FIG. 6 is a sectional view taken along the line A—A of FIG. 3 after the assembly.

FIG. 6 is a sectional view taken along the line A—A of FIG. 3, which illustrates the state where the support frame 3 and the front case 1 are assembled. As in the drawing, the guide rib 1a which slides into the guide groove 3c of the support frame 3 is formed at a predetermined location of the front case 1. Therefore, the guide rib 1a and the guide portion 3d of the support frame 3 guide the support frame 3, enabling smooth assembly of the support frame 3 and the front case 1. During and after assembly, the guide rib 1a abuts the inner wall 3e of the guide groove 3c, pushing the outer walls of the front case 1 outward. Therefore, instead of the front case 1 being distorted inward, it maintains its outer form, preventing the contaminants, such as dust, from entering through a paper space. Since the front case 1 maintains its outer form, the rear case 4 and the front case 1 can be easily and swiftly assembled.

Figure 7:
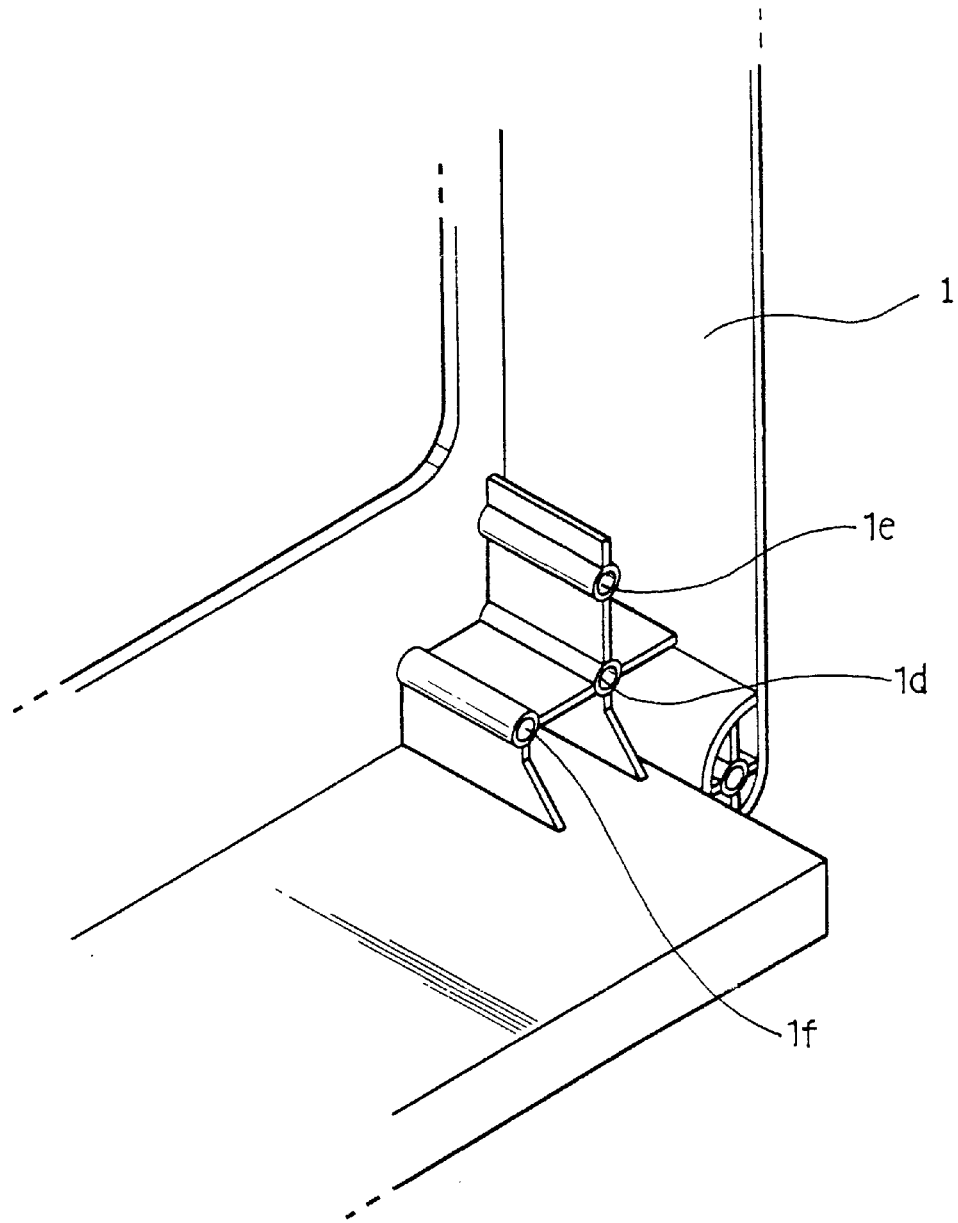
FIG. 7 is a rear view of the front case according to the present invention.

FIG. 7 is a rear view of the front case of FIG. 3 according to the invention.

In the arrangement of FIGS. 1 and 2, two bolts pass through two holes of the lugs 3a of the front case 1 so as to be inserted into the bosses 1e and 1f of FIG. 7 while another bolt passes through a hole of the lug 2a of the CRT 2 to be inserted into the boss 1d of FIG. 7. Accordingly, the CRT 2 and a corner of the supporting frame 3 are secured to the corresponding corner of the front case 1.

In the embodiment according to the present invention, however, only a single bolt passes through a hole of the lug 2a of FIG. 5 and a hole of the lug 3b so as to be inserted into the boss 1d of the front case 1 of FIG. 7 so that the CRT 2 and a corner of the supporting frame 3 are secured to the corresponding corner of the front case 1. Accordingly, while 3 bolts are necessary at a corner of the front case in the arrangement of FIGS. 1 and 2, only one bolt is necessary at a corner in the present invention as shown in FIG. 5, thereby reducing the amount of work done and the number of parts needed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying; out the present invention, but that the present invention includes all embodiments falling within the scope of the appended claims.

What is claimed is:

1. A support frame for securing a cathode ray tube between a front case and a rear case of a monitor, wherein first lugs are provided at each corner portion of the cathode ray tube, and second lugs are provided on the support frame at locations corresponding to locations of the first lugs, said first lugs and said second lugs being engaged to secure the cathode ray tube and the support frame;

wherein a plurality of guide ribs is provided along inner walls of the front case, and a plurality of guide grooves to receive the guide ribs is provided at an outer periphery of the support frame, whereby said support frame is guided into position relative to said front case when assembling the front case and the support frame.

2. The support frame of claim 1, further comprising a plurality of guide portions surrounding each said guide groove, each said guide portion being partly bent to smoothly receive said guide rib at an inner surface of said each guide groove.

3. The support frame of claim 1, wherein said support frame has a plurality of portions which are discontinuous, and which have guide portions bent substantially perpendicularly relative to a plane of the support frame, gaps between said guide portions forming said guide grooves.

4. The support frame of claim 3, wherein vertical edges of said support frame extending between said guide portions form inner walls of said guide grooves, and each of said guide ribs presses against a respective one of said inner walls of said guide grooves when said each of said guide ribs is received in a respective one of said guide grooves, whereby the front case maintains outer form when the front case and the support frame are assembled.

5. A monitor for displaying an image according to external signals, comprising:

a front case;

a cathode ray tube having first lugs at corners thereof, said CRT being disposed at a rear side of the front case;

a rear case secured to a back side of the front case to contain the cathode ray tube therebetween;

a support frame disposed between the cathode ray tube and the rear case, and having second lugs at locations corresponding to locations of the first lugs of the cathode ray tube to secure the cathode ray tube to the support frame; and securing means for engaging the cathode ray tube, the front case and the support frame in a single securing operation;

wherein a plurality of guide ribs is provided along an inner wall of the front case, and a plurality of guide grooves to receive the guide ribs is provided at a periphery of the support frame.

6. The monitor of claim 5, wherein said securing means comprises bolts and bosses to receive the bolts provided on the front case at locations corresponding to the locations of the first lugs, the lugs being secured by the bolts and bosses.

7. The monitor of claim 6, wherein the bosses receiving the bolts are provided, one at each corner, in the front case.

8. The monitor of claim 5, wherein the front case engages the support frame while maintaining its outer form when the front case and the support frame are assembled.

9. The monitor of claim 8, further comprising a plurality of guide grooves, each said guide portion being partly bent to smoothly receive said guide rib at an inner plane of each said guide groove.

10. The support frame of claim 5, wherein said support frame has a plurality of portions which are discontinuous, and which have guide portions bent substantially perpendicularly relative to a plane of the support frame, gaps between said guide portions forming said guide grooves.

11. The support frame of claim 10, wherein vertical edges of said support frame extending between said guide portions form inner walls of said guide grooves, and each of said guide ribs presses against a respective one of said inner walls of said guide grooves when said each of said guide ribs is received in a respective one of said guide grooves, whereby the front case maintains outer form when the front case and the support frame are assembled.

12. A monitor for displaying an image according to external signals, comprising:

a front case;

a cathode ray tube disposed at a rear side of the front case for displaying images according to said external signals;

a rear case secured to a back side of the front case to contain the cathode ray tube therebetween;

a rectangular support frame disposed between the cathode ray tube and the rear case for supporting the cathode ray tube;

securing means for engaging the CRT, the front case and the support frame in a single securing operation; and aligning and supporting means for aligning the front case and the support frame during assembly, and for supporting the front case to prevent distortion of the front case after assembly;

wherein said aligning and supporting means comprises guide ribs protruding from an inner surface of the front case and guide grooves provided on the support frame for receiving the guide ribs.

13. The monitor of claim 12, wherein said securing means comprises bolts and bosses to receive the bolts, said bosses being provided on the front case.

14. The monitor of claim 13, wherein one of the bosses receiving the bolts is provided at each corner of the front case.

15. The monitor of claim 12, wherein the guide ribs are provided along an inner wall of the front case and disposed at a front side of the cathode ray tube, the wherein the guide grooves are provided at a periphery of the support frame, and wherein the front case engages the support frame while maintaining its outer form when the front case and the support frame are assembled.

16. The monitor of claim 15, further comprising a plurality of guide portions surrounding each said guide groove, each said guide portion being partly bent to smoothly receive said guide rib at an inner plane of each said guide groove.

17. The support frame of claim 12, wherein said support frame has a plurality of portions which are discontinuous, and which have guide portions bent substantially perpendicularly relative to a plane of the support frame, gaps between said guide portions forming said guide grooves.

18. The support frame of claim 17, wherein vertical edges of said support frame extending between said guide portions form inner walls of said guide grooves, and each of said guide ribs presses against a respective one of said inner walls of said guide grooves when said each of said guide ribs is received in a respective one of said guide grooves, whereby the front case maintains outer form when the front case and the support frame are assembled.

* * * * *